United States Patent
Huang

(10) Patent No.: US 11,941,736 B2
(45) Date of Patent: Mar. 26, 2024

(54) SYSTEMS AND METHODS FOR MOTION-CONTROLLED ANIMATION

(71) Applicant: Google LLC, Mountain View, CA (US)

(72) Inventor: Shan Huang, Shanghai (CN)

(73) Assignee: GOOGLE LLC, Mountain View, CA (US)

( * ) Notice: Subject to any disclaimer, the term of this patent is extended or adjusted under 35 U.S.C. 154(b) by 304 days.

(21) Appl. No.: 17/039,538

(22) Filed: Sep. 30, 2020

(65) Prior Publication Data

US 2022/0101587 A1 Mar. 31, 2022

Related U.S. Application Data

(63) Continuation of application No. PCT/CN2020/119279, filed on Sep. 30, 2020.

(51) Int. Cl.
| | |
|---|---|
| *G06T 13/00* | (2011.01) |
| *G06N 20/00* | (2019.01) |
| *G06T 7/246* | (2017.01) |
| *G06T 7/73* | (2017.01) |
| *G06T 13/40* | (2011.01) |
| *G06T 15/20* | (2011.01) |
| *H04N 7/15* | (2006.01) |

(52) U.S. Cl.
CPC ............ *G06T 13/40* (2013.01); *G06N 20/00* (2019.01); *G06T 7/251* (2017.01); *G06T 7/73* (2017.01); *G06T 15/205* (2013.01); *H04N 7/157* (2013.01); *G06T 2207/20101* (2013.01); *G06T 2207/30196* (2013.01); *G06T 2215/16* (2013.01)

(58) Field of Classification Search
CPC ......... G06T 13/40; G06T 13/00; G06T 13/80; G06T 13/20; A63F 13/10
USPC ........................................................ 345/473
See application file for complete search history.

(56) References Cited

U.S. PATENT DOCUMENTS

| | | | |
|---|---|---|---|
| 8,471,848 B2 | 6/2013 | Tschesnok | |
| 2019/0381404 A1* | 12/2019 | Buttner | ................... G06T 13/00 |
| 2021/0012549 A1* | 1/2021 | Comer | ............... G06K 9/00288 |

OTHER PUBLICATIONS

Schreer et al., "Real-Time Avatar Animation Steered by Live Body Motion", 8 pages.

* cited by examiner

*Primary Examiner* — Gordon G Liu
(74) *Attorney, Agent, or Firm* — Dority & Manning, P.A.

(57) ABSTRACT

Systems and methods can enable the control the motion of an animated character based on imagery (e.g., captured by an image capture device such as a web camera or "webcam") which shows a person in motion. Specifically, the animated character can be automatically rendered to have the same motion as the entity shown in the imagery (e.g., in real time). According to one aspect of the present disclosure, the animated character can be rendered by iteratively transforming (e.g., including deforming the actual geometry of) a vector-based surface illustration. Specifically, the systems and methods present disclosure can leverage the scalable and transformable nature of a vector-based surface illustration to provide more realistic motion-controlled animation, in which the underlying geometry of the animated character is able to be adjusted to imitate human motion more realistically (e.g., as opposed to basic rotations of fixed character geometry).

20 Claims, 9 Drawing Sheets

SYSTEMS AND METHODS FOR MOTION-CONTROLLED ANIMATION

PRIORITY

The present application is a continuation of PCT Patent Application Number PCT/CN2020/119279 having a filing date of Sep. 30, 2020. Applicant claims priority to and the benefit of each of such applications and incorporate all such applications herein by reference in its entirety.

FIELD

The present disclosure relates generally to computer-based animation. More particularly, the present disclosure relates to motion-controlled animation that leverages vector-based surface imagery.

BACKGROUND

Character animation has been always a complex process, owing, in large part, to the fact that characters typically have a significant number of independently moving body parts. As such, character animation has become a very specialized field of animation and typically requires years of training to master. Even for the professionally trained animators, animating motion of characters can still be quite a slow and laborious process, including tasks such as fully rigging a character and manually animating individual moving parts.

Certain existing techniques attempt to simplify character animation through motion capture, in which movement from people or objects is directly recorded. Various hardware solutions exist to perform motion capture. One complex approach which provides the most accurate capture requires the placement of physical markers on performers' bodies and faces and the positioning of multiple cameras around a space. This approach is capable of capturing full body movement and quite nuanced motion. However, it requires a complicated setup with special purpose hardware and is thus not accessible outside of high-end animation studios. Other, lighter-weight motion capture systems still rely on dedicated computer hardware such as, for example, depth cameras.

Furthermore, while certain existing technologies do enable motion-based puppeteering of an animated character, these technologies simply update asset bounding boxes and do not deform the actual geometry of the animated character. This results in animations which are less realistic and life-like. For example, simply rotating a fixed character illustration without deforming the actual geometry results in an unnatural feeling for the animation. In addition, most existing tools are limited to facial applications and do not provide full body recognition and animation.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for motion-controlled animation via vector-based graphics. The method includes obtaining, by a computing system comprising one or more computing devices, a vector-based surface illustration and a rigging skeleton at an initial pose, wherein the rigging skeleton comprises a plurality of rigging vectors that define a plurality of rigging vertices, and wherein correspondence data describes one or more correspondences between one or more rigging vectors or rigging vertices and one or more portions of the vector-based surface illustration. The method includes obtaining, by the computing system, a plurality of image frames that depict an entity in motion. The method includes, for each image frame of the plurality of image frames: processing the image frame with one or more machine-learned models to obtain landmark positions within the image frame for a plurality of facial or body landmarks of the entity; updating one or more respective positions of the plurality of rigging vertices of the rigging skeleton based on the landmark positions for the plurality of facial or body landmarks within the image frame; and performing a skinning algorithm to transform and render the vector-based surface illustration based on the respective positions of the plurality of rigging vertices of the rigging skeleton and the correspondence data.

Another example aspect of the present disclosure is directed to computing system for motion-controlled animation. The system includes one or more processors and one or more non-transitory computer-readable media that store instructions that, when executed by the one or more processors, cause the computing system to perform operations. The operations include obtaining a vector-based surface illustration and a rigging skeleton at an initial pose, wherein the rigging skeleton comprises a plurality of rigging vectors that define a plurality of rigging vertices, and wherein correspondence data describes one or more correspondences between one or more rigging vectors or rigging vertices and one or more portions of the vector-based surface illustration. The operations include obtaining, by the image capturing device, a plurality of image frames that depict entity an entity in motion. The operations include, for each image frame of the plurality of image frames: processing the image frame with one or more machine-learned models to obtain landmark positions within the image frame for a plurality of facial or body landmarks of the entity; updating one or more respective positions of the plurality of rigging vertices of the rigging skeleton based on the landmark positions for the plurality of facial or body landmarks within the image frame; and performing a skinning algorithm to transform and render the vector-based surface illustration based on the respective positions of the plurality of rigging vertices of the rigging skeleton and the correspondence data.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

The use of the same reference numerals in different FIGs. is intended to refer to similar features or operations in different example implementations.

DETAILED DESCRIPTION

Figure 1:
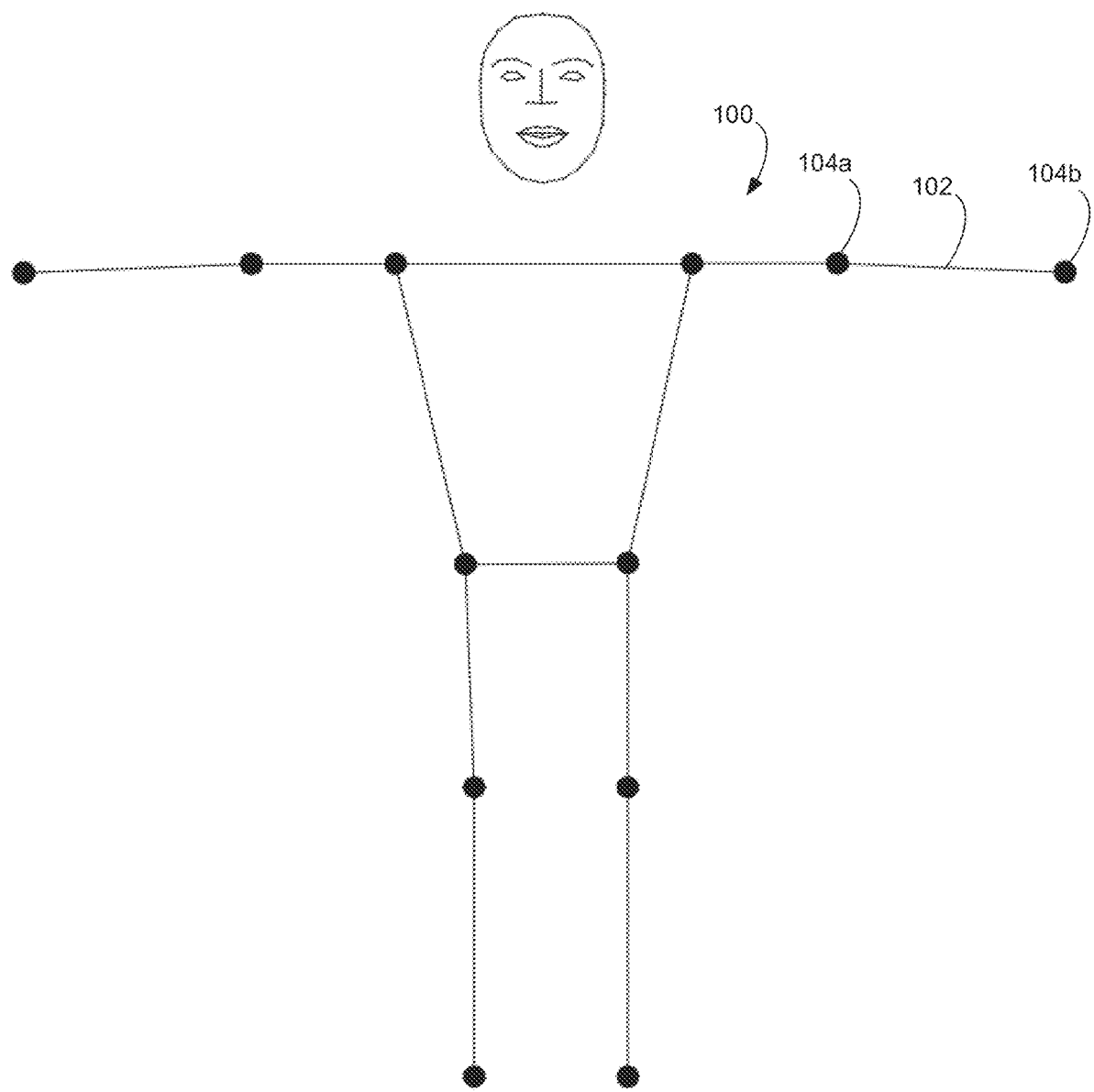
FIG. 1 depicts an example rigging skeleton according to example embodiments of the present disclosure.

Example aspects of the present disclosure are directed to systems and methods for achieving motion-controlled animation. In particular, the proposed systems and methods can enable a user to control the motion of an animated character based on imagery (e.g., captured by an image capture device such as a web camera or "webcam") which shows an entity (e.g., the user, a different person, an animal, a puppet, a moving object, etc.) in motion. Specifically, the animated character can be automatically rendered to have the same motion as the entity shown in the imagery (e.g., in real time). According to one aspect of the present disclosure, the animated character can be rendered by iteratively transforming (e.g., including deforming the actual geometry of) a vector-based surface illustration. Specifically, the systems and methods present disclosure can leverage the scalable and transformable nature of a vector-based surface illustration to provide more realistic motion-controlled animation, in which the underlying geometry of the animated character is able to be adjusted to imitate human motion more realistically (e.g., as opposed to basic rotations of fixed character geometry).

Thus, in some examples, a computer-implemented animation system can start with obtaining a vector-based surface illustration (e.g., supplied by a user) and a rigging skeleton at an initial pose. For example, the vector-based surface illustration can be a Scalable Vector Graphics file. The vector-based surface illustration and rigging skeleton can be respectively made up of a plurality of illustration vectors and a plurality of rigging vectors. A set of correspondence data can describe how the plurality of illustration vectors and the plurality of rigging vectors correspond to one another (e.g., according to or based on some user input that correlates the surface illustration with the rigging skeleton). The animation system can also obtain a plurality of image frames that depict an entity in motion. For example, the image frames can be captured by an image capture device such as, for example, a webcam. In some implementations, the animation process can be performed concurrently and in real time with the capture of image frames. The animation system can use one or more machine-learned models to process each image frame to obtain landmark positions within the image frame for a plurality of facial or body landmarks of the entity. The animation system can update one or more respective positions of the plurality of rigging vertices of the rigging skeleton based on the landmark positions, thereby generating a new pose for the rigging skeleton. Finally, a skinning algorithm can skin—transform and render—the surface illustration onto the rigging skeleton in the new pose based on the correspondence data. This process can be performed iteratively as additional image frames are made available, resulting in the animated character mimicking the motion of the entity depicted in the imagery. As used herein, an entity can be any person, animal, or object depicted in imagery.

Thus, the present disclosure leverages motion capture (e.g., in the form of iteratively updating detected landmark locations) to perform the challenging task of animating characters. In particular, example implementations take a 2D vector illustration and update its containing curves in real-time based on the recognition results from one or more machine-learned models. For example, skeleton-based animation can be applied to the vector illustration based on the recognition results to animate the character in motion.

More particularly, some example implementations can start with obtaining a vector-based surface illustration and a rigging skeleton at an initial pose. In some implementations, the vector-based surface illustration can be made up of a plurality of illustration vectors that define one or more illustration vertices and/or the rigging skeleton can be made of a plurality of rigging vectors that define one or more rigging vertices. In some instances, the rigging vectors of the rigging skeleton can be hierarchically organized and/or referred to as "bones."

The vector-based surface illustration and rigging skeleton can correspond to one another via correspondence data. The correspondence data can, for example, be provided by or based on a user input. The correspondence data can describe one or more correspondences between one or more illustration vectors or illustration vertices and one or more rigging vectors or rigging vertices. Stated differently, certain rigging vectors or vertices can be defined to correspond to certain portions of the surface illustration (e.g., correspond to certain illustration vectors or vertices of the surface illustration).

In some implementations, the vector-based surface illustration can be described in an input file, such as a scalable vector graphics file. As one example, in some implementations, the computing system can parse an input surface illustration (e.g., SVG file) for the vector illustration and the predefined skeleton, both of which can be in T-pose (initial pose).

For animating the vector-based surface illustration with the rigging skeleton, a plurality of image frames that depict an entity in motion can be used. For example, the image frames can be captured (e.g., in real time while the animation is performed) by an image capture device such as a webcam, a camera-enabled smartphone, or other camera devices or may be obtained from an existing video file (e.g., stored and accessed from memory).

In some implementations, three phases of operations can be performed on each image frame to create a corresponding animated frame. First, the image frame can be processed by one or more machine-learned models. The one or more machine-learned models processing the frame can output detected face and/or body landmarks. More specifically, the machine-learned models can detect various facial and body landmarks of the entity in the image frame. For instance, the machine-learned models could detect a right elbow, a left eye, three eyebrow locations, etc. of the entity. After detecting such landmarks, the one or more machine-learned models can output landmark positions of the detected facial and body landmarks. Examples of machine-learned models can include, either separately or in combination, the set of machine-learned models which are known as FaceMesh (see, e.g., Kartynnik et al., Real-time Facial Surface Geometry from Monocular Video on Mobile GPUs, in CVPR 2019) or PoseNet (see, e.g., Kendall et al., PoseNet: A Convolutional Network for Real-Time 6-DOF Camera Relocalization, in ICCV 2015).

In some implementations, additional operations of determining confidence scores of the landmark positions and smoothing the landmark positions can be performed. For example, the confidence scores can be output by the machine-learned models described above. As one example, confidence scores can be used to smooth the landmark positions with respect to the one or more respective positions that those landmark positions would replace. The one or more respective positions are the current positions. The confidence scores can be produced by the one or more machine-learned models. For instance, both FaceMesh and PoseNet can output confidence scores alongside outputting the landmark positions.

Specifically, smoothing the landmark positions can entail bringing the landmark positions with low confidence scores closer to the corresponding current position. In one example, smoothing can be performed by constructing a new, smoothed landmark position as a weighted sum of the landmark position and the current position. The weights can be calculated as a percentage of the sum of the landmark confidence score and the current confidence score. The landmark confidence score can be the confidence score of the landmark position. The current confidence score can be the confidence score previously calculated for the current position. The weight attributed to the landmark position can be the landmark confidence score divided by the sum of the landmark confidence score and the current confidence score. The weight attributed to the current position can be the current confidence score divided by the sum of the landmark confidence score and the current confidence score.

However, sometimes the landmark positions can be significant distances from the respective positions of the rigging vertices. Updating the respective rigging vertex positions to such landmark positions can make the animation look disjointed. Additionally, the landmark positions can include some erroneous change from the previous frame despite the entity in the plurality of image frames not moving. Updating to the respective rigging vertex positions to, or based on, the landmark positions in these situations can make an animation look jittery. To counter these issues, some example implementations use the landmark confidence scores to smooth the landmark positions and/or changes in the positions of the rigging vertices, thereby reducing the disjointedness and jitteriness in the corresponding illustration.

In some implementations, if confidence scores for landmark positions are identified to be less than a certain threshold, the animation system can choose to not render certain parts of the vector-based surface illustration that correspond to such landmark positions. Stated differently, the parts of the vector-based surface illustration not rendered can correspond to the illustration vectors and illustration vertices that have a correspondence, per the correspondence data, with rigging vectors and rigging vertices that correspond to the landmark positions with low confidence scores. For instance, a set of landmark positions corresponding to rigging vertices within a path (e.g., a set of vertices connected by one or more vectors) might all have low confidence scores. In one example, if the average confidence score across the landmark positions is less than a certain threshold, the animation system may not render the illustration vectors and illustration vertices with a correspondence to those rigging vertices.

In a second phase, after receipt of the landmark positions from the machine-learned models, the animation system can use the landmark positions to update one or more respective positions of the rigging vertices. The landmark positions can represent positions of a plurality of facial or body landmarks in the image frame. The landmark positions could replace or could be used to update the one or more respective positions of the rigging vertices that represent the same or related facial or body landmarks represented by the landmark positions. Thus, a new pose can be determined for the rigging skeleton based on the landmarks.

For the third phase, the animation system can perform a rendering algorithm such as, for example, a skinning algorithm to transform and render the vector-based surface illustrations to match the updates to the one or more respective positions of the rigging vertices. As one example, the illustration vectors and vertices corresponding to the rigging vertices which were moved can also move with the change in the one or more respective positions of the rigging vertices. Thus, the computing system can transform (e.g., including deforming the actual geometry of) the vector-based surface illustration according to the updated positions of the rigging vectors/vertices.

More particularly, as one simplified example, a skinning algorithm can simply move and rotate, without deforming or transforming, parts of the vector-based surface illustration to the updated positions of corresponding rigging vertices. The corresponding rigging vertices can be rigging vertices that can have a correspondence, per the correspondence data, with illustration vectors and illustration vertices that correspond to the parts of the vector-based surface illustration. For instance, if a forearm changed position in the frame, the skinning algorithm can move parts of the vector-based surface illustration corresponding to the forearm to the forearm's updated position.

In some implementations, a more robust skinning algorithm, like Linear Blend Skinning for example, can be used. Linear blend skinning can alter or deform the surface illustration to closely match the facial or body parts within the image frame that the animation is mimicking. Linear blend skinning can be particularly good at deforming parts of the vector-based surface illustration where the underlying illustration vectors and illustration vertices have a correspondence towards rigging vertices defined by two or more rigging vectors. Such rigging vertices can include joints that represent facial or body landmarks such as an elbow or shoulder. Specifically, the degree of deformation is the degree to which parts of the vector-based surface illustration should stretch or shrink when a bend occurs at the rigging vertex defined by two or more rigging vectors. A bend at a rigging vertex can occur when at least one rigging vector that defines the rigging vertex changes orientation.

In some implementations, the degree of stretching or shrinking can be represented by weights given to the underlying rigging vectors with respect to a rigging vertex. Specifically, for each rigging vertex, the weights can be applied to the rigging vectors that define that rigging vertex.

Weight application can be performed after obtaining the vector-based surface illustration and the rigging skeleton. The weights can be applied manually, or the weights can be applied automatically. For instance, the weights can be evenly spread across the rigging vectors that define the rigging vertex. Such weights can be calculated by one divided by the number of rigging vectors that define the rigging vertex. A more natural spread of weights can be effected by inversely relating the weight to the distance, or the distance squared, between the rigging vertex and the nearest illustration vertex. The nearest illustration vertex can have a correspondence with the rigging vector that will be attributed with the weight.

Thus, one example flow for performing motion-based character animation can include the following steps. First, a computing system can parse an input SVG file for the vector illustration and the predefined skeleton, both of which are in T-pose (initial pose). Next, the computing system can iterate through every segment in vector paths to compute the weight influence and transformation from each bone using Linear Blend Skinning. In real time, the computing system can run FaceMesh and PoseNet on each input frame and use the resulting keypoints to update the bone positions. Finally, the computing system can compute new positions of vector segments from the updated bone positions, bone weights, and transformations.

Example aspects of the present disclosure provide a number of technical effects and benefits. The systems and methods can allow generic computer hardware, such as a laptop and a webcam, to achieve motion-controlled animation. Moreover, generic computer hardware can achieve this motion-controlled animation in real time.

As another example technical effect, the systems and methods can reduce the use of network bandwidth in streaming for things like video conference calls. For instance, in streaming a live feed, data for every pixel in the frame is typically sent. With the motion-controlled animation methods, the updated positions of the one or more rigging vertices can be sent, and the animated frame can be rebuilt from those updated positions by the streaming viewers.

With reference now to the FIGS., example embodiments of the present disclosure will now be discussed in detail.

Figure 2:
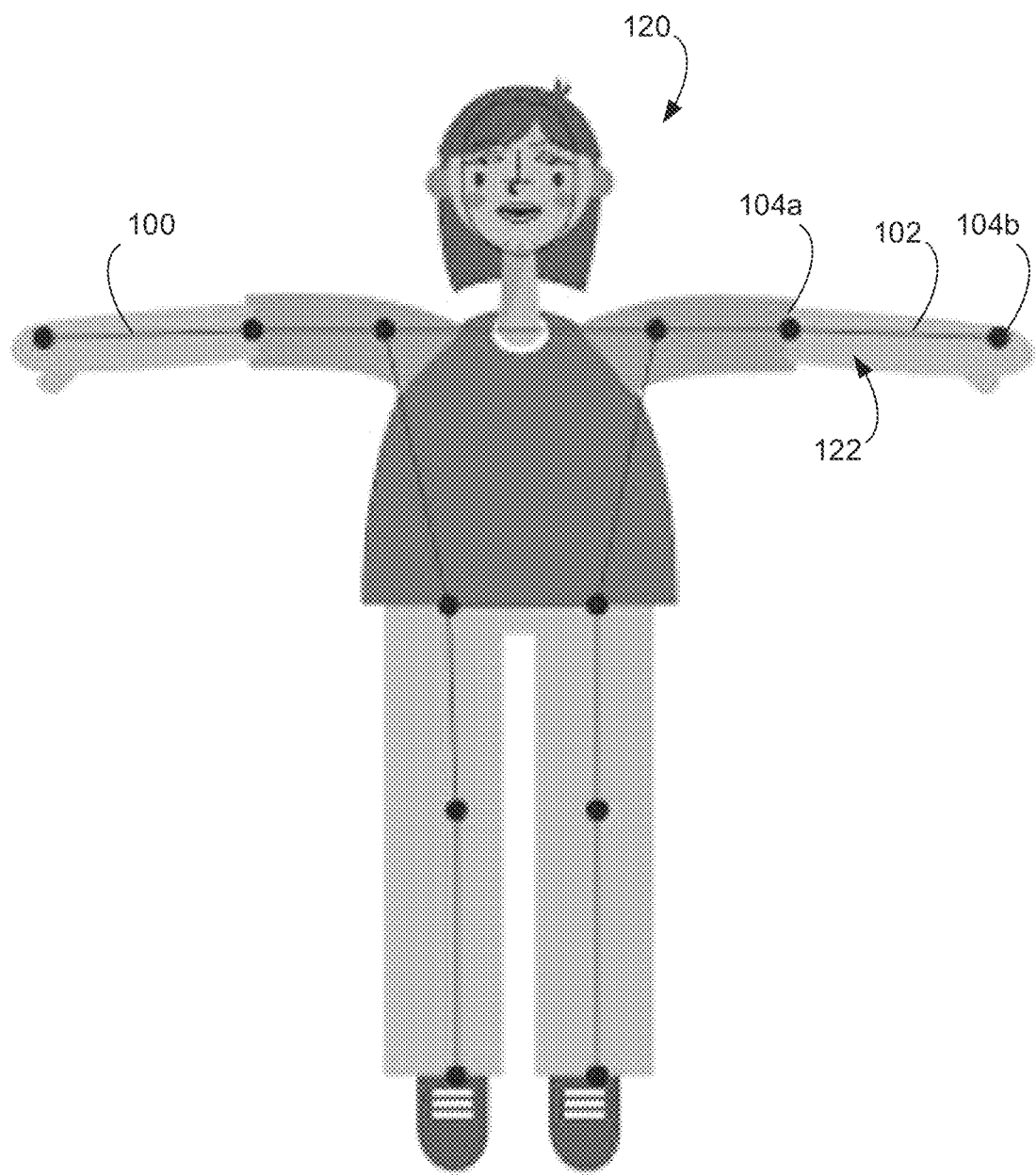
FIG. 2 depicts an example vector-based surface illustration with an example rigging skeleton superimposed according to example embodiments of the present disclosure.

FIGS. 1-2 depict examples of the initial resources of the motion-controlled animation: the rigging skeleton and the vector-based surface illustration. FIG. 1 depicts an initial rigging skeleton 100 where an initial rigging skeleton 100 is a rigging skeleton at an initial pose. The rigging skeleton 100 can include a number of rigging vectors (e.g., rigging vector 102). Each rigging vector of the plurality of rigging vectors can define two rigging vertices. For example, rigging vector 102 defines or is defined by vertices 104a and 104b. Each rigging vector and/or vertex can correspond to one or more facial or body landmarks. For example, rigging vector 102 can correspond to a left forearm while rigging vertex 104a can correspond to a left elbow.

In particular, in some implementations, the rigging skeleton can be designed according to the output key points from one or more machine-learned models (e.g., PoseNet and FaceMesh). For example, PoseNet returns 17 key points for the full body, which is simple enough to directly include in the rig. FaceMesh however provides 486 keypoints, and therefore some example implementations use less than all output facial keypoints. One example implementation leverages a rigging skeleton that has rigging vertices that correspond to 73 key points from the FaceMesh output and, together, has a full body rig of 90 keypoints (vertices) and 78 bones (vectors).

FIG. 2 depicts an initial vector-based surface illustration 120 with the initial rigging skeleton 100 superimposed on the initial vector-based surface illustration 120. An initial vector-based surface illustration 120 is a vector-based surface illustration at an initial pose. The initial rigging skeleton 100 superimposed on the initial vector-based surface illustration 120 helps graphically show how the correspondence data describes a correspondence between parts 122 of the initial vector-based surface illustration 120 and the rigging vectors 102 and rigging vertices 104. The vector-based surface illustration 120 can be any type of illustration and can depict any object or character. For example, the vector-based surface illustration 120 can be an illustration or image of the user.

In some implementations, every input surface illustration (e.g., SVG file) can contain or can be modified to contain a rigging skeleton in a default position. More specifically, in some implementations, the animation system can look for a group called 'skeleton' containing anchor elements named with the respective joint they represent. In some implementations, users can be enabled to move the joints around in their design files to best embed the rig into the character. The animation system can compute skinning according to the default position in the SVG file.

In some implementations, the animation system can include a skinning weight painting tool that enables a user to tweak individual weights on keypoints manually. This will provide more precision than auto weight assignment. In some implementations, the animation system can also support raster images in the input SVG files, so users may use photos/drawings in their design. Image bounding boxes can be represented as vector paths so the system can compute its deformation using the current rigging algorithm.

Figure 3:
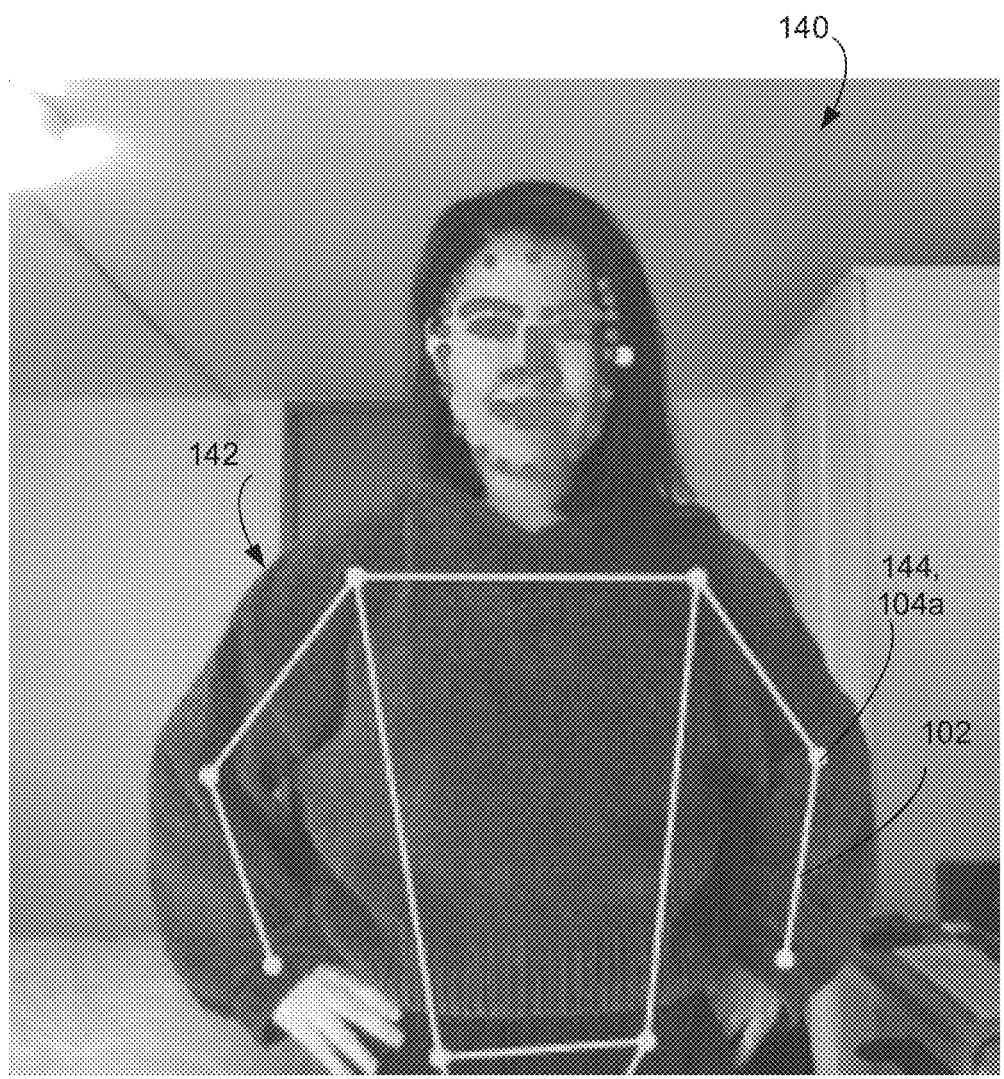
FIG. 3 depicts an example image frame depicting an entity in motion with facial and body landmark positions found by the one or more machine-learned models and superimposed on the image frame according to example embodiments of the present disclosure.

FIG. 3 depicts an example image frame 140 captured by image capture device, such as a webcam, that depicts an entity 142 in motion. The landmark positions of a plurality of facial and body landmarks of the entity 142 are overlaid upon the image frame 140. For example, body landmark 144 corresponds to a left elbow of the entity 142.

In some implementations, the landmark positions are outputs of one or more machine-learned models that processed the image frame 140. In some implementations, as described above, the rigging skeleton can be designed to at least in part directly correspond to the landmark positions output by the models. As such, the keypoint 144 may directly correspond to the vertex 104a of the example rigging skeleton 100 of FIG. 1. Thus, the rigging vector 102 is shown in FIG. 3 as well.

Figure 4:
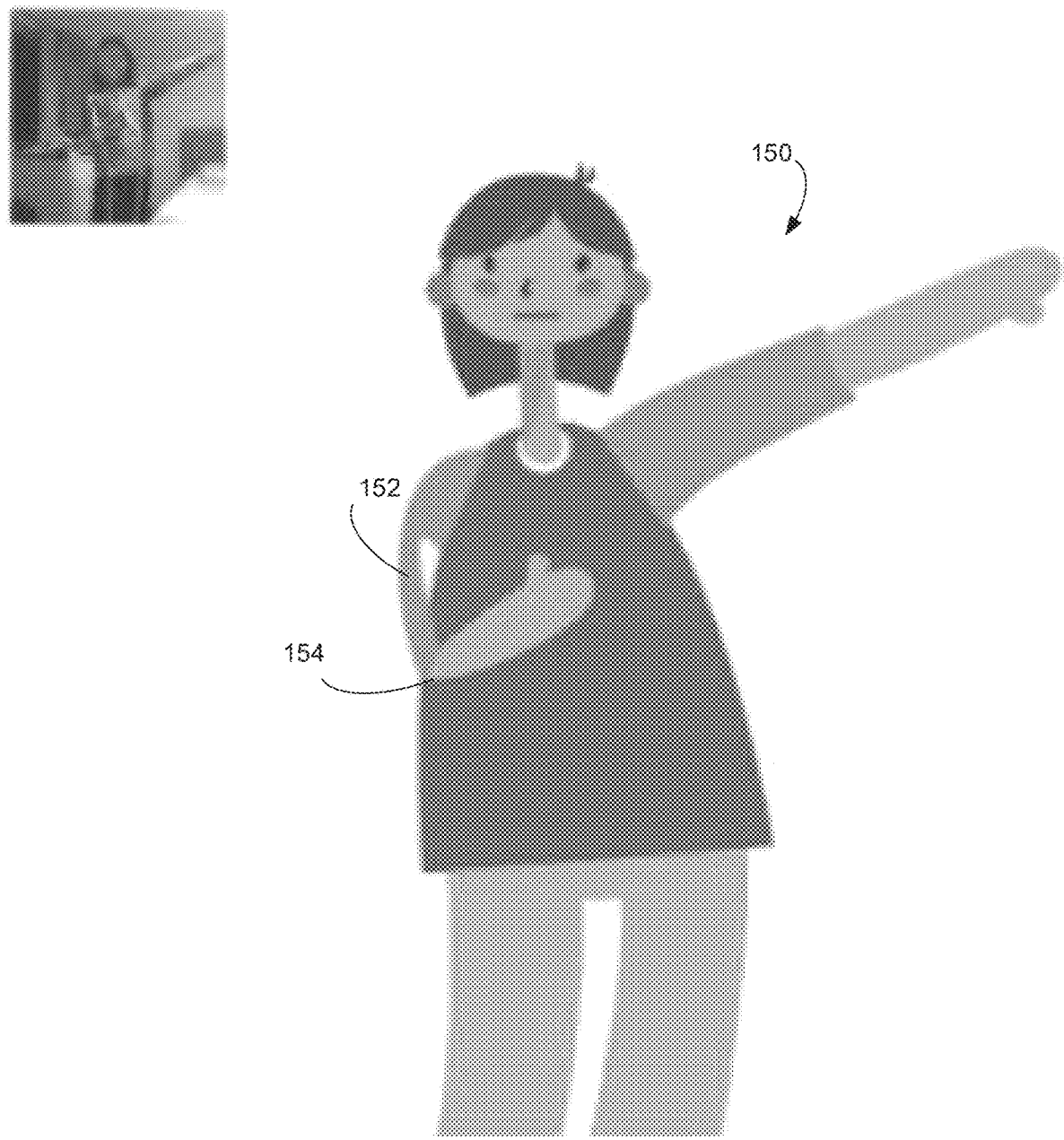
FIG. 4 depicts an example animated frame that has gone through Linear Blend Skinning.
Figure 5:
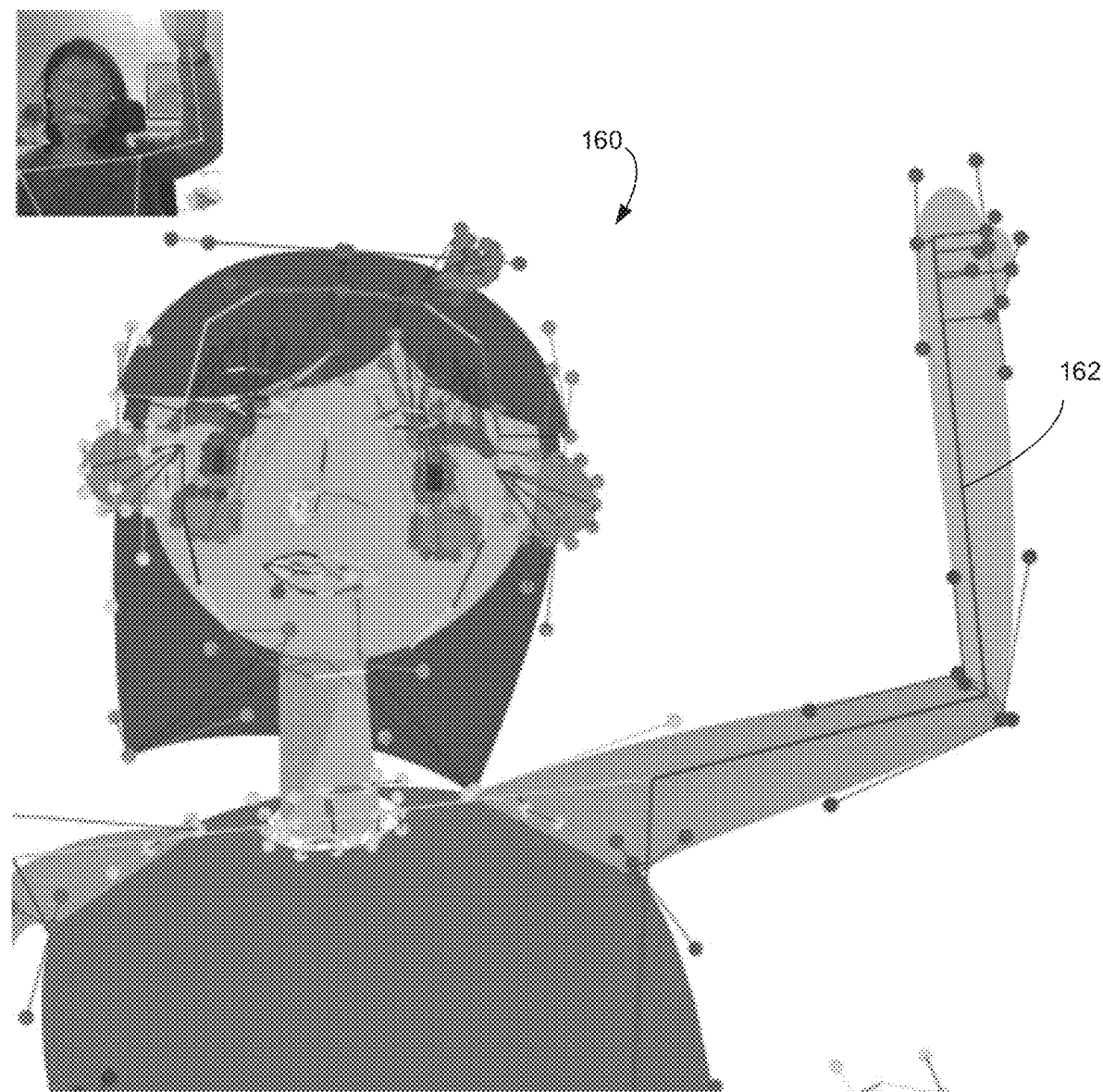
FIG. 5 depicts an example animated frame that has gone through Linear Blend Skinning where the rigging skeleton, illustration vectors, and illustration vertices are superimposed.

FIGS. 4-5 depict examples of animated frames generated according to the example techniques described herein. In each of FIGS. 4 and 5, the corresponding image that depicts the entity is provided in the upper-left corner for purposes of illustration. The image is provided to assist in understanding of the correspondence between the entity and the animation but is not necessary. Stated differently, the animated frame does not necessarily include or need to be presented alongside the captured imagery.

FIG. 4 depicts an animated frame 150. As a result of the Linear Blend Skinning, deformations of the vector-based surface illustration occur in the parts of the vector-based surface illustration. As one example, by comparing FIG. 4 with FIG. 2, deformations can be observed at bends 152 and 154. Bends can occur at a rigging vertex when at least one rigging vector that defines the rigging vertex changes orientation from its orientation in the initial pose.

FIG. 5 depicts an altered animated frame 160 with illustration vectors and illustration vertices superimposed. For example, illustrator vector 162 may correspond to rigging vector 102 of FIG. 1. Similar to the initial vector-based surface illustration 120 of FIG. 2, the superposition of the illustration vectors and illustration vertices helps graphically show how the correspondence data describes the correspondences. For example, in the example shown, the illustration vectors and vertices are more numerous than the rigging vectors and vertices.

Figure 6:
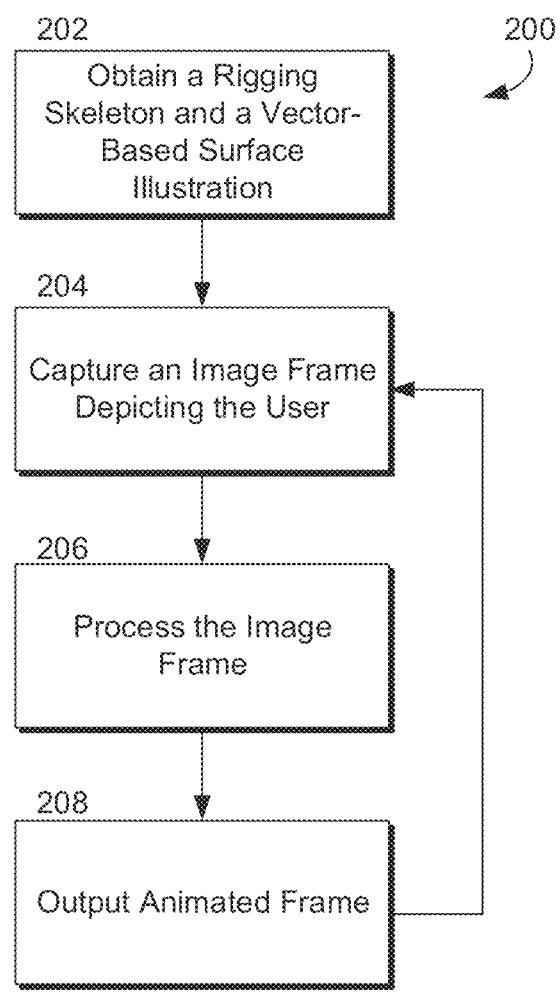
FIG. 6 depicts a flow chart for an example method for motion-controlled animation according to example embodiments of the present disclosure.
Figure 7:
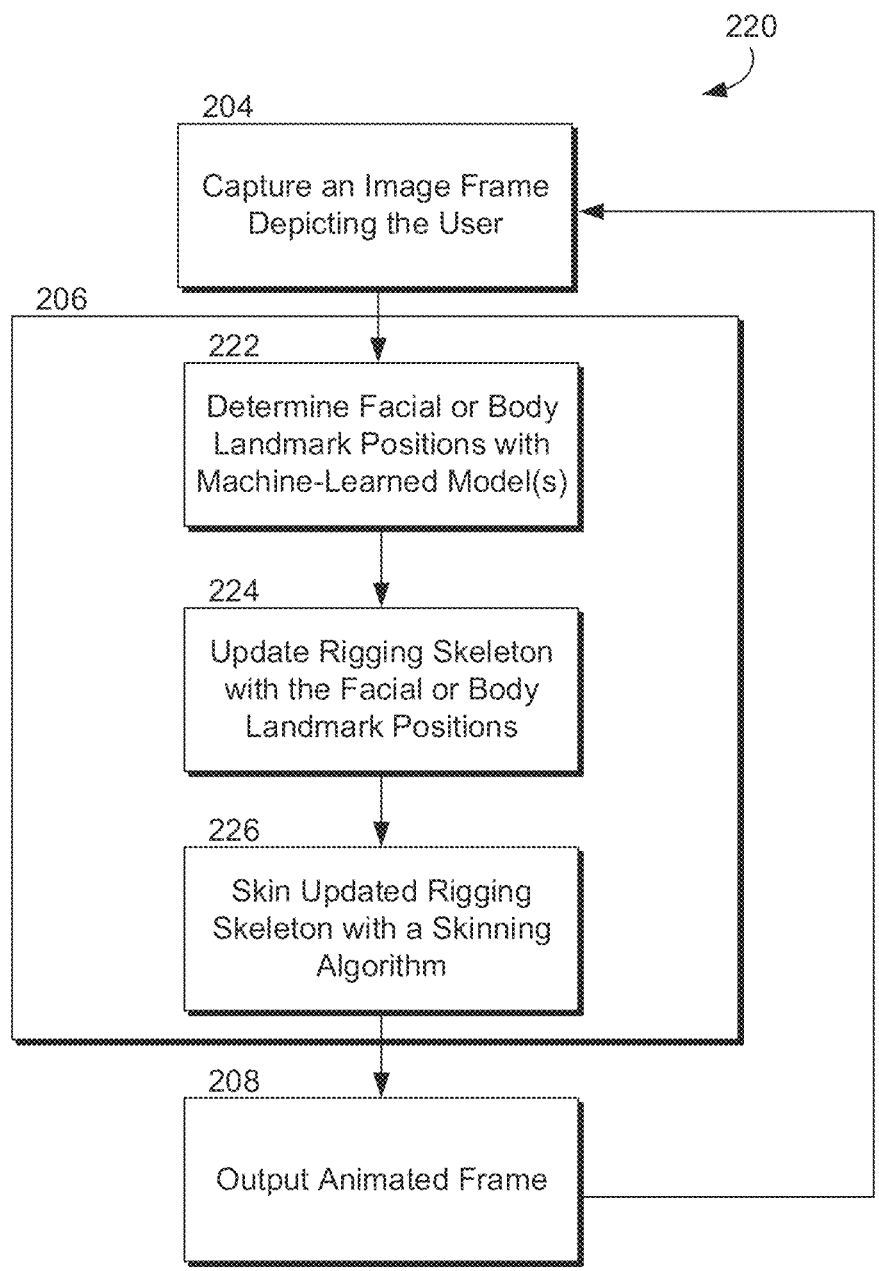
FIG. 7 depicts a flow chart for an example method for motion-controlled animation according to example embodiments of the present disclosure.
Figure 8:
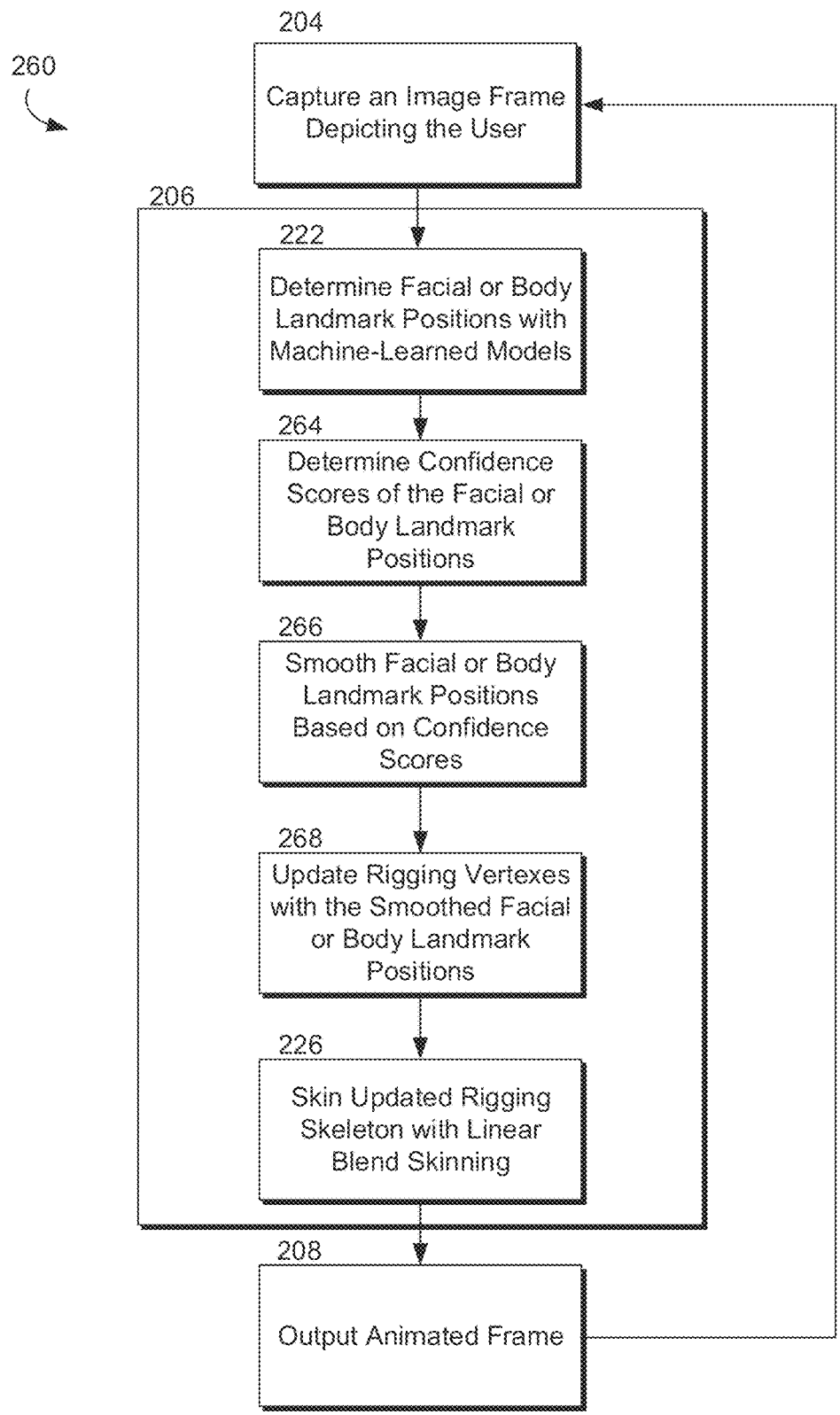
FIG. 8 depicts a flow chart for an example method for motion-controlled animation according to example embodiments of the present disclosure.

FIGS. 6-8 provide flowcharts for example methods for motion-controlled animation that leverage aspects of the data shown in FIGS. 1-5. Although FIGS. 6-8 depict steps performed in a particular order for purposes of illustration and discussion, the methods of the present disclosure are not limited to the particularly illustrated order or arrangement. The various steps of FIGS. 6-8 can be omitted, rearranged, combined, and/or adapted in various ways without deviating from the scope of the present disclosure.

FIG. 6 provides an overarching flow chart 200 for the one example embodiment. For initial resources, a rigging skeleton and vector-based surface illustration can be obtained as indicated by block 202. A plurality of image frames depicting the entity in motion can be included in the initial resources or, as shown in FIG. 6, can be captured iteratively. Per block 204, the next image frame can be captured by an image capture device. Although FIG. 6 indicates capturing the image frame after obtaining the rigging skeleton and vector-based surface illustration, block 204 could occur before block 202. At block 206 the image frame can be processed. Processing the image frame at 206 can result in an animated frame which can be outputted in block 208. After 208, the method can return to block 204 and obtain the next image frame. As indicated above, various of the blocks (e.g., 206 and 208) can occur in parallel with other blocks (e.g., 204). For example, processing 206 for frame t can occur in parallel while frame t+1 is being captured or otherwise obtained.

FIG. 7 shows a flow chart 220 illustrating example steps that can be performed in block 206 of FIG. 6 which corresponds to processing the image frame. Referring to FIG. 7, the initial block 222 in 206 can have an image frame processed by one or more machine-learned models to determine landmark positions of one or more facial or body landmarks. Examples of the one or more machine-learned models can include, either separately or in combination, FaceMesh and PoseNet.

At block 224, those landmark positions determined at 222 can be used to update one or more respective positions of rigging vertices. For instance, a landmark representing the left elbow could update respective positions of rigging vertices that also represent the left elbow.

With the updated rigging skeleton from 224, then at block 226 the vector-based surface illustration can be transformed and rendered by a skinning algorithm to match the updates. In some implementations, the skinning algorithm could be as simple as a bounding box algorithm. A bounding box algorithm can be simply moving and rotating, without deforming or transforming, parts of the vector-based surface illustration.

However, in other implementations, block 226 can include performing a Linear Blend Skinning (LBS) algorithm for vector paths. LBS is an algorithm for deforming surfaces using skeletal structures. LBS transforms a vertex on a surface by blending together its transformation controlled by each bone alone, weighted by each bone's influence. In example implementations of the present disclosure, a vertex refers to an illustrator vertex while bones are rigging vectors defined by two rigging vertices.

In some examples, for each rigging vertex, a set of weights can be attributed to each rigging vector that defines the rigging vertex. In some implementations, the weights can be applied manually. In some implementations, the weights can be applied automatically. For instance, the weights can be evenly spread across the rigging vectors that define the rigging vertex. Such weights can be calculated by one divided by the amount of rigging vectors that define the rigging vertex. A more natural spread of weights can be done by inversely relating the weight to the distance, or the distance squared, between the rigging vertex and the nearest illustration vertex. The nearest illustration vertex can have a correspondence with the rigging vector that will be attributed with the weight.

To express using mathematical formulas, the world space position of the illustration vertex $v'_i$ can be computed as $$v'_i = \sum_{j=1}^{m} w_{i,j} T_j v_i$$

where:
$w_i$ is the influence of bone i on vertex i,
$v_i$ describes vertex i's initial position, and
$T_j$ describes the spatial transformation that aligns the initial pose of bone j with its current pose.

In some implementations, the influence of bones can be automatically generated or manually assigned through weight painting. In some implementations, the raw influence of bone j on vertex i can be calculated as:

$$w_{i,j} = 1/d^2$$

where d is the distance from $v_i$ to the nearest point on bone j. Finally, some example implementations normalize the weight of all bones for a vertex to sum up to 1.

$$\sum_{j=0}^{m} w_{i,j} = 1$$

In some implementations, to apply LBS on 2D illustration vector paths, which can be composed of straight lines and/or Bezier curves, some special treatment for Bezier curve segments with in and out handles can be performed. For example, some implementations can compute weights separately for curve points, in control point, and out control point. This can produce better looking results because the bone influence for control points are more accurately captured.

However, in some implementations, there is one exception case. When the in control point, curve point, and out control point are collinear, the curve point weight can be used for all three points to guarantee that they stay collinear when animated. This helps to preserve the smoothness of curves. Thus, collinear handles can be kept collinear; while weights for handles that are not collinear can be computed individually.

FIG. 8 shows a flow chart 260 illustrating other example steps that can be optionally performed in block 206 of FIG. 6 which corresponds to processing the image frame. The illustrated steps include smoothing and Linear Blend Skinning. FIG. 8 is similar to FIG. 7 except that FIG. 8 includes steps for smoothing landmark positions. These steps include blocks 264 and block 266 which can occur in that order after determining the landmark positions in block 222 and before updating the rigging skeleton in block 226.

In particular, while LBS gives animated frames, there's a noticeable amount of uttering introduced by the raw output of common machine learning models. To reduce the jitter and get smoother animation, example implementations can use the confidence scores from prediction results to weigh each input frame unevenly, granting less influence to low-confidence frames.

Referring to block 264 of FIG. 8, a set of confidence scores of the landmark positions can be determined to help smooth, or alter, the landmark positions. A confidence score can determine the degree of error—or, conversely, confidence—associated with the determined landmark position. In some implementations, confidence scores can be determined with the one or more machine-learned models used to determine the landmark positions. For instance, the one or more machine-learned models in FaceMesh and PoseNet can provide confidence scores for the landmark positions that FaceMesh and PoseNet produce.

The smoothing, or altering, of the landmark positions can make the landmark positions appear to be more of a natural transition from the one or more respective positions—current positions—of the rigging vertices. Such smoothing is performed in block 266.

Specifically, a smoothed landmark position can be determined through a weighted sum of the landmark position and the current positions of corresponding rigging vertices. The weights can be calculated as a percentage of the sum of the landmark confidence score and the current confidence score. The landmark confidence score is the confidence score of the landmark position. The current confidence score is the confidence score previously calculated for the current position. The weight attributed to the landmark position is the landmark confidence score divided by the sum of the landmark confidence score and the current confidence score. The weight attributed to the current position is the current confidence score divided by the sum of the landmark confidence score and the current confidence score.

To express some of these concepts mathematically, at block 266 the animation system can compute a smoothed position of joint i (i.e., a particular rigging vertex) at frame t as $$J_i^t = J_i^{t-1} \frac{score_i^{t-1}}{score_i^{t-1} + score_i'^t} + J_i'^t \frac{score_i'^t}{score_i^{t-1} + score_i'^t}$$

where:

$J_i^{t-1}$ is the smoothed position of joint i in frame i−1;

$J'^t_i$ is the raw position of frame i's landmark keypoint output;

$score_i^{t-1}$ is the smoothed confidence score for frame i−1; and $score'^t_i$ is the raw confidence score of frame i's landmark keypoint output.

The smoothed confidence score of frame i can be computed as:

$$score_i^t = \frac{score_i^{t-1^2} + score_i'^{t^2}}{score_i^{t-1} + score_i'^t}$$

For the purpose of illustration, consider extreme cases. When two consecutive frames both have confidence score 1, position approaches the latest position at 50% speed, which looks responsive and reasonably smooth. (To further play with responsiveness, a user can tweak the approach speed by changing the weight on the latest frame.) When the latest frame has confidence score 0, its influence is completely ignored, preventing low confidence results from introducing sudden jerkiness.

In some implementations, smoothing in block 266 can also include determining whether or not to render parts of the vector-based surface illustration based in part on confidence scores, which may also be referred to as confidence score-based clipping. The parts of the vector-based surface illustration not rendered can correspond to illustration vectors and illustration vertices. The illustration vectors and illustration vertices have a correspondence, per the correspondence data, with rigging vectors and rigging vertices. Those rigging vertices, including the rigging vertices defined by those rigging vectors, can correspond to the landmark positions with low confidence scores.

Specifically, a set of landmark positions corresponding to rigging vertices within a path—a set of vertices connected by vectors—might all have low confidence scores. If the average confidence score across the landmark positions is identified to be less than a certain threshold, the illustration vectors and illustration vertices with a correspondence to those rigging vertices can be determined not to render.

Thus, in addition to interpolating joint positions with confidence scores, example implementations also introduce a minimum threshold to decide if a path should be rendered at all. The confidence score of a path can be the averaged confidence score of its segment points, which in turn can be the weighted average of the influence bones' scores. The whole path can be hidden for a particular frame when its score is below a certain threshold.

Clipping in such fashion can be useful for hiding paths in low confidence areas, which are often body parts out of the camera view. Imagine an upper body shot: PoseNet will always return keypoint predictions for legs and hips though they will have low confidence scores. With this clamping mechanism, example implementations can make sure lower body parts are properly hidden instead of showing up as strangely distorted paths.

While the example rigging algorithms described above are discussed with reference to two-dimensional curves, these or other rigging algorithms can be used to perform skinning on three-dimensional data such as three-dimensional mesh models.

Figure 9:
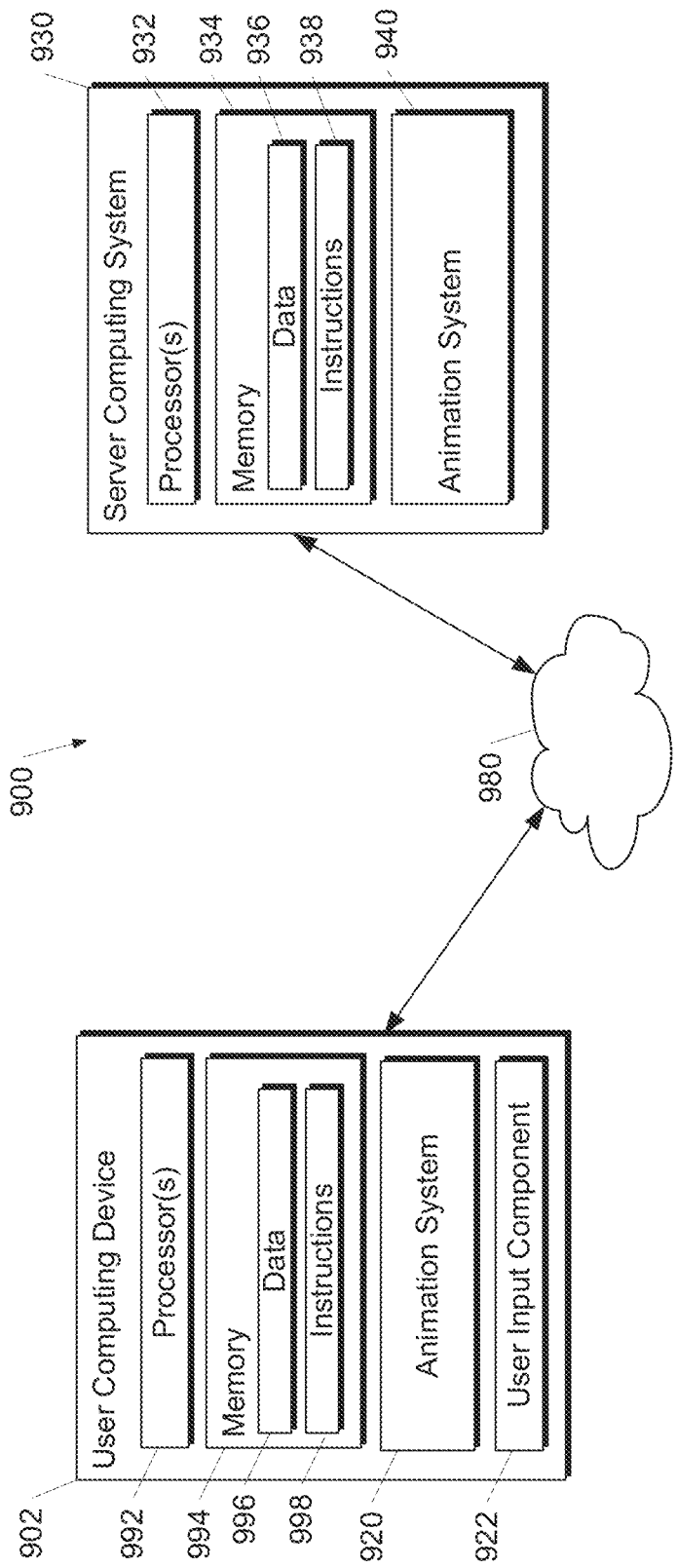
FIG. 9 depicts a block diagram of an example computing system according to example embodiments of the present disclosure.

FIG. 9 depicts a block diagram of an example computing system 900 for motion-based character animation according to example embodiments of the present disclosure. The system 900 includes a user computing device 902 and a server computing system 930 that are communicatively coupled over a network 980.

The user computing device 902 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 902 includes one or more processors 992 and a memory 994. The one or more processors 992 can be any suitable processing device (e.g., a processor core, a microprocessor, an ASIC, a FPGA, a controller, a microcontroller, etc.). and can be one processor or a plurality of processors that are operatively connected. The memory 994 can include one or more non-transitory computer-readable storage mediums, such as RAM, ROM, EEPROM, EPROM, flash memory devices, magnetic disks, etc., and combinations thereof. The memory 994 can store data 996 and instructions 998 which are executed by the processor 992 to cause the user computing device 902 to perform operations.

In some implementations, the user computing device 902 can store or include one or more animation systems 920. For example, an animation system 920 can be a standalone computer application and/or can be implemented within an existing application such as an existing browser application. In some implementations, the animation system 920 can be received from the server computing system 930 over network 980, stored in the user computing device memory 994, and then used or otherwise implemented by the one or more processors 992. In some implementations, the user computing device 902 can implement multiple parallel instances of a single animation system 920 (e.g., to perform parallel character animation across multiple streams of input images).

Additionally or alternatively, one or more animation systems 940 can be included in or otherwise stored and implemented by a server computing system 930 that communicates with the user computing device 902 according to a client-server relationship. For example, the animation systems 940 can be implemented by the server computing system 940 as a portion of a web service (e.g., a character animation service). Thus, one or more aspects of an animation system 920 can be stored and implemented at the user computing device 902 and/or one or more aspects of the animation system 940 can be stored and implemented at the server computing system 930.

The user computing device 902 can also include one or more user input components 922 that receive user input. For example, the user input component 922 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input. As another example, a user input component can include a camera such as a web camera or "webcam".

The server computing system 930 includes one or more processors 932 and a memory 934. The one or more processors 932 can be any suitable processing device (e.g., a processor core, a microprocessor, an ASIC, a FPGA, a controller, a microcontroller, etc.) and can be one processor or a plurality of processors that are operatively connected. The memory 934 can include one or more non-transitory computer-readable storage mediums, such as RAM, ROM, EEPROM, EPROM, flash memory devices, magnetic disks, etc., and combinations thereof. The memory 934 can store data 936 and instructions 938 which are executed by the processor 932 to cause the server computing system 930 to perform operations.

In some implementations, the server computing system 930 includes or is otherwise implemented by one or more server computing devices. In instances in which the server computing system 930 includes plural server computing devices, such server computing devices can operate according to sequential computing architectures, parallel computing architectures, or some combination thereof. As described above, the server computing system 930 can store or otherwise include one or more animation systems 940.

The network 980 can be any type of communications network, such as a local area network (e.g., intranet), wide area network (e.g., Internet), or some combination thereof and can include any number of wired or wireless links. In general, communication over the network 980 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 9 illustrates one example computing system that can be used to implement the present disclosure. Other different distributions of components can be used as well. For example, some or all of the various aspects of the server computing system can instead be located and/or implemented at the user computing device 902.

In particular, in one example extension and use case, the illustrated system can include another, second user device. This may be useful, for example, for using character animation to reduce usage of network bandwidth in situations of video streaming, such as, for example, in videoconference systems. Thus, the computing system can include at least two separate computing devices, the at least two separate computing devices comprises a first computing device and a second computing device. For example, the devices can operate during a video conference between the at least two separate computing devices, wherein the first computing device is associated with the user, the second computing device is associated with another participant of the video conference.

For each image frame of a plurality of image frames: the first computing device can process the image frame and update one or more respective positions of a plurality of rigging vertices of the rigging skeleton. The first computing device can transmit data that describes the updated positions of the rigging skeleton to the second computing device. The second computing device can perform a skinning algorithm to render the character animation at the second computing device. Thus, the rendering at the second computing device can visualize motion of the first user at the first user device, but the raw video/image data does not need to be transmitted.

While the present subject matter has been described in detail with respect to specific example embodiments thereof, it will be appreciated that those skilled in the art, upon attaining an understanding of the foregoing, may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for motion-controlled animation via vector-based graphics, the method comprising:

obtaining, by a computing system comprising one or more computing devices, a vector-based surface illustration and a rigging skeleton at an initial pose, wherein the rigging skeleton comprises a plurality of rigging vectors that define a plurality of rigging vertices, and wherein correspondence data describes one or more correspondences between one or more rigging vectors or rigging vertices and one or more portions of the vector-based surface illustration;

obtaining, by the computing system, a plurality of image frames that depict an entity in motion; and for each image frame of the plurality of image frames:

processing the image frame with one or more machine-learned models to obtain landmark positions within the image frame for a plurality of facial or body landmarks of the entity;

updating one or more respective positions of the plurality of rigging vertices of the rigging skeleton based on the landmark positions for the plurality of facial or body landmarks within the image frame; and performing a skinning algorithm to transform and render the vector-based surface illustration based on the respective positions of the plurality of rigging vertices of the rigging skeleton and the correspondence data.

2. The computer-implemented method for motion-controlled animation of claim 1, wherein the vector-based surface illustration comprises a scalable vector graphics file.

3. The computer-implemented method for motion-controlled animation claim 1, further comprising, for each image frame:

determining, by the computing system and for each rigging vertex of the plurality of rigging vertices, a respective transformation weight for each rigging vector of the plurality of rigging vectors that defines the rigging vertex, wherein the transformation weight is used in the skinning algorithm to alter the transformation and rendering of the vector-based surface illustration.

4. The computer-implemented method for motion-controlled animation of claim 3, wherein the skinning algorithm comprises a Linear Blend Skinning algorithm.

5. The computer-implemented method for motion-controlled animation of claim 1, wherein the plurality of image frames are captured by a web cam.

6. The computer-implemented method for motion-controlled animation of claim 1, further comprising, for each image frame of the plurality of image frames:

determining one or more confidence scores for the landmark positions; and smoothing, based at least in part on one or more confidence scores, the landmark positions with respect to the one or more respective positions of the plurality of rigging vertices.

7. The computer-implemented method for motion-controlled animation of claim 1, further comprising:

determining one or more confidence scores for the landmark positions;

identifying one or more of the landmark positions that have confidence scores that are less than a minimum threshold; and determining not to render one or more parts of the vector-based surface illustration that correspond to rigging vertices that correspond to the landmark positions that have confidence scores that are less than the minimum threshold.

8. The computer-implemented method for motion-controlled animation of claim 1, wherein said obtaining the plurality of image frames and, for each image frame of the plurality of image frames, said processing the image frame, said updating one or more respective positions, and said performing the skinning algorithm are performed in real time while said image frames are captured.

9. The computer-implemented method for motion-controlled animation of claim 1, wherein the method is performed by a browser application.

10. The computer-implemented method for motion-controlled animation of claim 1, wherein:

the method is performed during a video conference; and for each image frame of the plurality of image frames:

said processing the image frame and said updating the one or more respective positions of the plurality of rigging vertices of the rigging skeleton are performed by a first computing device that is associated with the entity;

said performing the skinning algorithm is performed by a second computing device that is associated with another participant of the video conference; and the method further comprises transmitting, by the first computing device to the second computing device, the updated positions of the plurality of rigging vertices.

11. The computer-implemented method of claim 1, wherein the vector-based graphic comprises a two-dimensional vector illustration comprising a plurality of two-dimensional curves.

12. The computer-implemented method of claim 1, wherein the entity comprises a human user.

13. A computing system for motion-controlled animation, system comprising:

one or more processors; and one or more non-transitory computer-readable media that store instructions that, when executed by the one or more processors, cause the computing system to perform operations, the operations comprising:

obtaining a vector-based surface illustration and a rigging skeleton at an initial pose, wherein the rigging skeleton comprises a plurality of rigging vectors that define a plurality of rigging vertices, and wherein correspondence data describes one or more correspondences between one or more rigging vectors or rigging vertices and one or more portions of the vector- based surface illustration;

obtaining a plurality of image frames that depict an entity in motion; and for each image frame of the plurality of image frames:

processing the image frame with one or more machine-learned models to obtain landmark positions within the image frame for a plurality of facial or body landmarks of the entity;

updating one or more respective positions of the plurality of rigging vertices of the rigging skeleton based on the landmark positions for the plurality of facial or body landmarks within the image frame; and performing a skinning algorithm to transform and render the vector-based surface illustration based on the respective positions of the plurality of rigging vertices of the rigging skeleton and the correspondence data.

14. The computing system for motion-controlled animation of claim 13, wherein the vector-based surface illustration comprises a scalable vector graphics file.

15. The computing system for motion-controlled animation claim 13, wherein the operations further comprise, for each image frame:

determining, for each rigging vertex of the plurality of rigging vertices, a respective transformation weight for each rigging vector of the plurality of rigging vectors that defines the rigging vertex, wherein the transformation weight is used in the skinning algorithm to alter the transformation and rendering of the vector-based surface illustration.

16. The computing system for motion-controlled animation of claim 13, wherein the image capturing device comprises a webcam.

17. The computing system for motion-controlled animation of claim 13, wherein the operations further comprise, for each image frame of the plurality of image frames:
   determining one or more confidence scores for the landmark positions; and
   smoothing, based at least in part on one or more confidence scores, the landmark positions with respect to the one or more respective positions of the plurality of rigging vertices.

18. The computing system for motion-controlled animation of claim 13, wherein said obtaining the plurality of image frames and, for each image frame of the plurality of image frames, said processing the image frame, said updating one or more respective positions, and said performing the skinning algorithm are performed in real time while said image frames are captured.

19. The computing system for motion-controlled animation of claim 13, wherein the operations are performed by a browser application.

20. The computing system for motion-controlled animation of claim 13, wherein:
   the one or more processors and the one or more non-transitory computer-readable media comprise at least two separate computing devices, the at least two separate computing devices comprises a first computing device and a second computing device;
   the operations are performed during a video conference between the at least two separate computing devices, wherein the first computing device is associated with the entity, the second computing device is associated with another participant of the video conference; and
   for each image frame of the plurality of image frames:
      said processing the image frame and said updating the one or more respective positions of the plurality of rigging vertices of the rigging skeleton are performed by the first computing device;
      said performing the skinning algorithm is performed by the second computing device; and
   the operations further comprise transmitting, by the first computing device to the second computing device, the updated positions of the plurality of rigging vertices.

* * * * *